(12) United States Patent  (10) Patent No.: US 7,714,619 B2
Yamada  (45) Date of Patent: May 11, 2010

(54) HIGH-FREQUENCY CLOCK DETECTION CIRCUIT

(75) Inventor: Kenta Yamada, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 0 days.

(21) Appl. No.: 12/211,429

(22) Filed: Sep. 16, 2008

(65) Prior Publication Data

US 2009/0108878 A1    Apr. 30, 2009

(30) Foreign Application Priority Data

Oct. 31, 2007   (JP)   ............................. 2007-283196

(51) Int. Cl.
   *G01R 19/00* (2006.01)
   *H03K 5/19* (2006.01)
(52) U.S. Cl. .............................. 327/18; 327/19; 327/20; 326/93
(58) Field of Classification Search .................. 327/18, 327/19, 20
   See application file for complete search history.

(56) References Cited

U.S. PATENT DOCUMENTS 6,002,733 A * 12/1999 Kim ........................... 375/377

7,042,250 B1 * 5/2006 Ghosh et al. .................. 326/93

FOREIGN PATENT DOCUMENTS

JP     07-151839    6/1995

* cited by examiner

*Primary Examiner*—Lincoln Donovan
*Assistant Examiner*—John W Poos
(74) *Attorney, Agent, or Firm*—Studebaker & Brackett PC; Donald R. Studebaker

(57) ABSTRACT

In order to provide a high frequency clock detection circuit capable to detect a high frequency clock using any period as a threshold, the high frequency clock detection circuit of the present invention includes a delay circuit having a delay time set to be longer than a clock period corresponding to the irregular high frequency state, a first flip-flop circuit for delay flip-flopping according to the clock signal and for being provided with the inverted and feedback inputted output from the first flip-flop circuit, a second flip-flop circuit for delay flip-flopping according to the clock signal and for being provided with the inverted and feedback inputted output from the second flip-flop circuit through the delay circuit, and a detection-result output circuit for detecting a difference between the output signal from the first flip-flop circuit and the output signal from the second flip-flop circuit and for providing the function circuit with the high frequency clock detection signal indicating the irregular high frequency state corresponding to an occurrence of the difference.

7 Claims, 7 Drawing Sheets

HIGH-FREQUENCY CLOCK DETECTION CIRCUIT

BACKGROUND OF THE INVENTION

1. Field of the Invention

The present invention relates to a high-frequency clock detection circuit installed in a circuit device such as LSI, etc. operating based on a clock frequency and detecting an irregularity that clock frequency is heightened.

This is a counterpart of Japanese patent application Serial Number 283196/2007, filed on Oct. 31, 2007, the subject matter of which is incorporated herein by reference.

2. Description of the Related Art

Accounting terminals used in banking systems need to be highly secure. The accounting terminal has a risk of hacking for tampering with the data or stealing the data by attacks from outside or inside enterprises. There are various methods for attacking to LSIs, and one of methods for attacking is heightening intentionally the external clock of LSIs to arise malfunction of CPU in LSIs. Therefore, a clock detecting circuit is necessary to detect a clock frequency other than the predetermined frequency in order to prevent malfunction of the LSIs by the above attack.

FIG. 1 is a general diagram of the conventional clock detection circuit. In the clock detection circuit, reference clock is generated by a ring oscillator for immunity to attack from outside. Counting up is done by the counter A based on the reference clock and the counter B based on the CPU clock, respectively, and it detected whether the frequency of the CPU clock is a high frequency of the high frequency clock or not, by monitoring the ratio of the CPU clock to the reference clock using the overflow signal of the counters or the counting values.

However, in the example of FIG. 1, since the monitoring and the detection are done at a certain constant period till the counter is overflowed during detecting high-frequency clock, it is impossible to detect an attack by a short-time high-frequency clock such as several to several hundred pulses of high-frequency clock.

In the Japanese Patent Application Laid-Open Publication No. H7-151839, the semiconductor test equipment having capability to prevent malfunction by detecting that the clock signal period exceeds the limit is disclosed. Therefore, it is possible to detect a short-time attack by high-frequency clock by installing the above clock detection circuit in order to prevent hacking.

However, according to the technology disclosed in the Japanese Patent Application Laid-Open Publication No. H7-151839, there is a problem that a limit is put on the clock-signal period to be detected. The above-mentioned technology has a configuration that the detection signal is generated by direct logic addition of the delayed signal waveform, which has the predetermined pulse width as a criterion and is delayed by the clock-signal pulse width, and the clock-signal waveform, wherein the pulse width of the clock signal is fixed. In other words, in the case where the clock-signal period varies and the clock-signal pulse width also varies, it is not considered that there is a case where the faster becomes the clock, the shorter becomes the pulse width, while the duty ratio is fixed. For example, it must be determined that all the pulse periods having a pulse width shorter than 15 nsec are irregular, while the 15 nsec pulse width has been predetermined.

The present invention has been invented in the consideration of the above-mentioned problem, and the object of the invention is to provide a high-frequency clock detection circuit having capability to detect high-frequency clock signal using any period as a threshold.

A high-frequency clock detection circuit according to the present invention detects a irregular state of the high frequency in the clock signal after taking in the clock signal from the function circuit operating according to the clock signal, and the high-frequency clock detection circuit includes a delay circuit, a first flip-flop circuit, a second flip-flop circuit, and a detecting-result output circuit. To the delay circuit, a delay time longer than a period corresponding to the irregular state of the high frequency is set. The first flip-flop circuit delay flip-flops according to the clock signal, and the output signal becomes an inverted-feedback input thereto. The second flip-flop circuit delay flip-flops according to the clock signal, and the output signal becomes an inverted-feedback input thereto. The detecting-result output circuit detects the difference between the output signal from the first flip-flop circuit and the output signal from the second flip-flop circuit, and provides the function circuit with a high-frequency-clock detection signal indicating the irregular state of the high frequency corresponding to occurrence of the differential.

DETAILED DESCRIPTION OF THE PREFERRED EMBODIMENTS

Preferred Embodiments of the present invention will be explained in details, using the attached drawings, as follows.

First Embodiment

Figure 1:
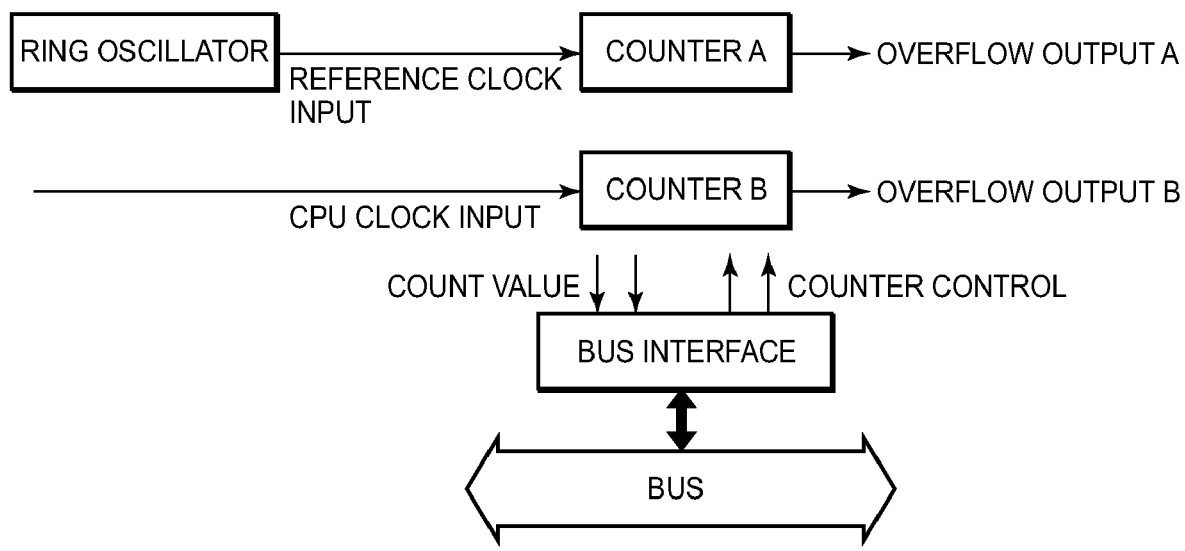
FIG. 1 is a general block diagram showing the conventional high frequency clock detection circuit.
Figure 2:
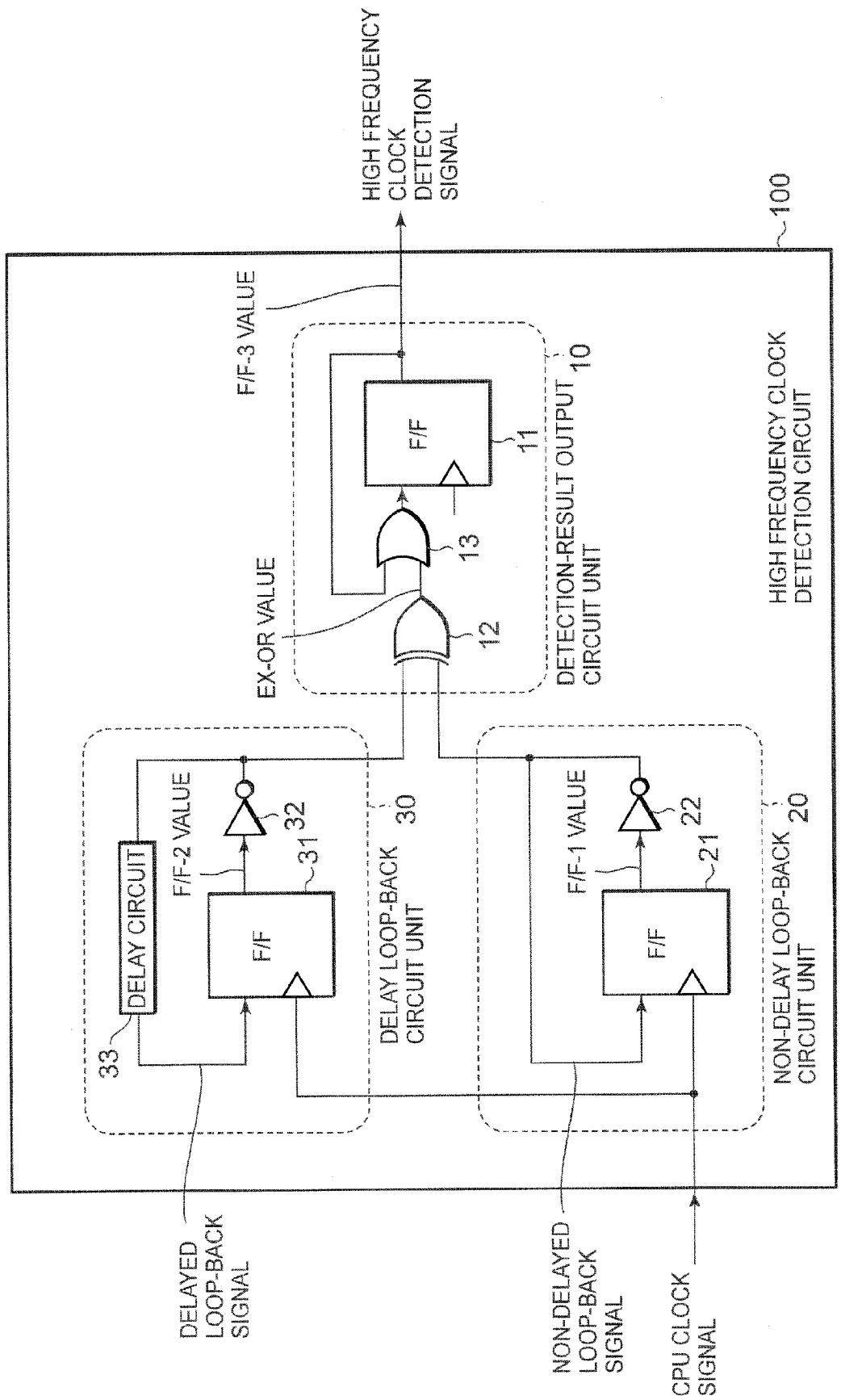
FIG. 2 is a block diagram of a high frequency detection circuit according to the first embodiment.

FIG. 2 is a block diagram of a high-frequency clock detection circuit according to the first embodiment of the invention. A high-frequency clock detection circuit 100 is mainly divided to the main three circuit units, and has a configuration that a non-delay loop-back circuit 20, a delay loop-back circuit 30, and a detection-result output circuit 10 are included.

The non-delay loop-back circuit 20 includes a D (delay)-type flip-flop circuit 21 and an inverting circuit 22, so that the output signal (F/F-1 value) of the flip-flop circuit 21 is inverted by the inverting circuit 22 and the inverted signal is feedback inputted to the flip-flop circuit 21 by directly loop-backing as a non-delayed loop-back signal.

A delay loop-back circuit 30 includes a D-type flip-flop circuit 31, an inverting circuit 32, and a delay circuit 33, so that the output signal (F/F-2 value) of the flip-flop circuit 31 is inverted by the inverting circuit 32 and the inverted signal is feedback inputted to the flip-flop circuit 31 as a delayed and loop-backed signal after being delayed by the delay circuit 33. In addition, the clock terminal of the flip-flop circuit 31 is provided with a CPU clock signal from the outside.

The delay circuit 33 is realized by using delay a device such as a buffer, etc. A delay time TD of the delay circuit 33 is settable to any value by a configuration of the delay device, and provides a threshold for determining the irregular high frequency. The delay time TD is usually set to be a slightly longer delay time than a period TC corresponding to the maximum operating frequency of the CPU. For example, assuming that the maximum operating frequency of the CPU is 50 MHz, the corresponding period TC is 20 nsec. Therefore, assuming that the irregular high-frequency clock is 48 MHz with some margin to the maximum operating frequency, the delay time TD of the delay circuit 33 is set to be 21 nsec. Obviously, it is possible that an irregular high-frequency is allowed to have the same or a higher frequency compared with the maximum operating frequency, and then the delay time TD can be set to be a larger, an equal, or a smaller value than the period TC of the maximum operating frequency. Furthermore, it possible that the delay time TD is set by after setting the irregular high-frequency to be a certain value having nothing to do with the maximum operating frequency of the CPU.

The detection-result output circuit 10 includes a D-type flip-flop circuit 11, a logic exclusive-OR circuit 12, and a logic OR circuit 13. The exclusive-OR circuit 12 outputs a logic exclusive-OR operation result (EXOR value) between the inverted signal from the non-delay loop-back circuit unit 20 and the inverted signal from the delayed loop-back circuit unit 30 to one of the input terminals of the logic OR circuit 13. The output signal from the logic OR circuit 13 is provided to the flip-flop circuit 11. The output signal from the flip-flop circuit 11 is outputted as a high-frequency clock detection signal and is also provided to the other input terminal of the logic OR circuit 13. The clock terminal of the flip-flop circuit 11 can be provided with an external CPU clock-signal and a control clock-signal provided by the control circuit.

Figure 3:
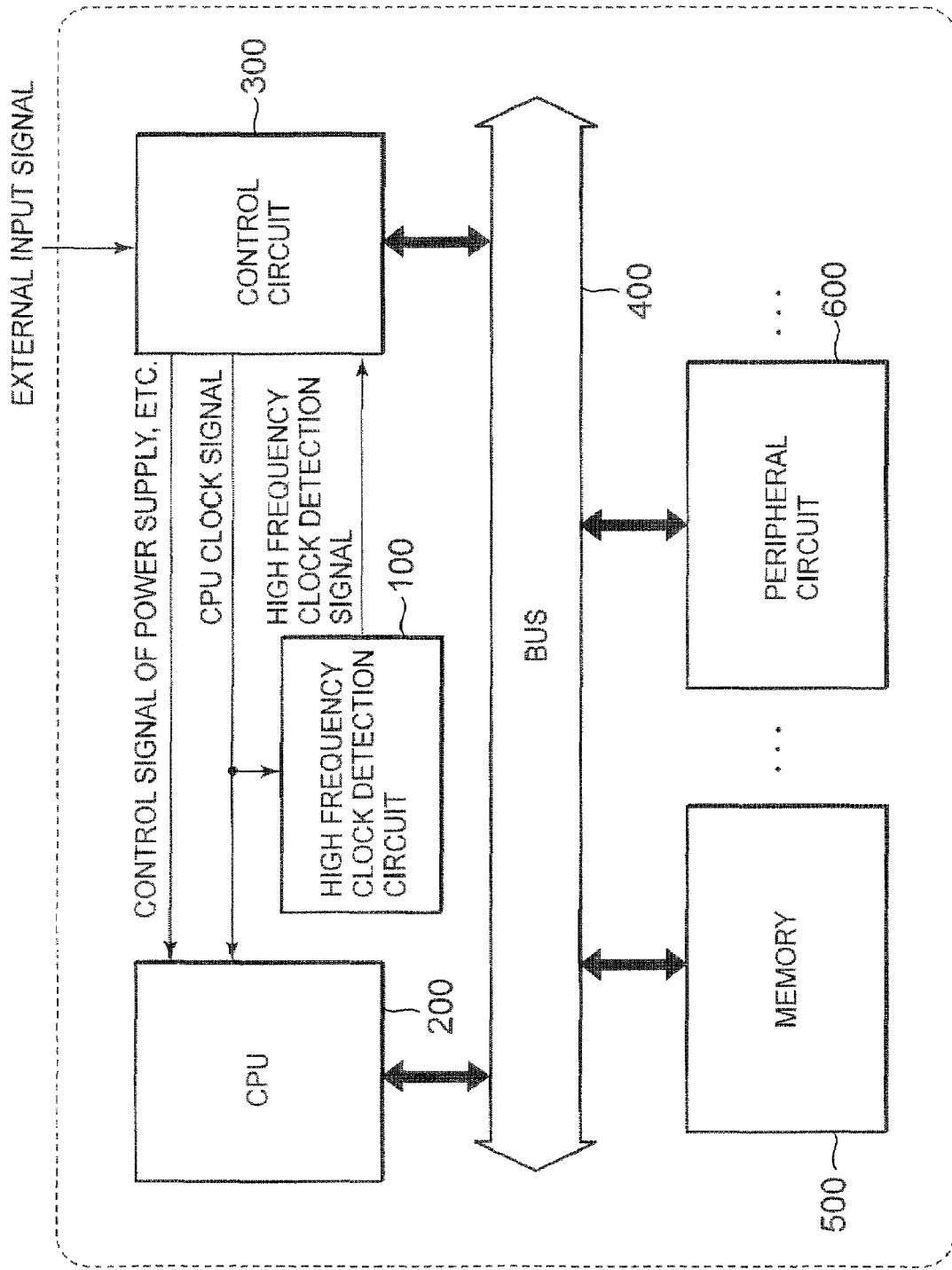
FIG. 3 is a block diagram of a case where a high frequency detection circuit of the invention is applied to a computer system

FIG. 3 shows a case where a high-frequency clock detection circuit of the present invention is applied to a computer system. In FIG. 3, as a function circuit for carrying out required functions, the computer system is composed by a CPU 200, a memory 500, a peripheral circuit 600 including a function module and an input-output module, etc., and a control circuit 300, and also the above units are connected to each other through a bus 400. The control circuit 300 is operated by a clock other than the CPU clock, for example, an internal ring oscillator clock. In addition, the control circuit 300 generates the CPU clock signal based on the external input clock, provides the CPU 200 with the CPU clock signal, and also controls the power on/off operation. The high-frequency clock detection circuit 100 takes in the CPU clock signal and provides simultaneously the control circuit 300 with the high-frequency clock detection signal, corresponding to the detection of the high frequency. Since the CPU clock signal is generated based on the external input clock signal, there is a possibility that the CPU clock signal becomes out of the regular frequency range by an external fraudulent operation or malfunction, and becomes an irregular high frequency.

Figure 4:
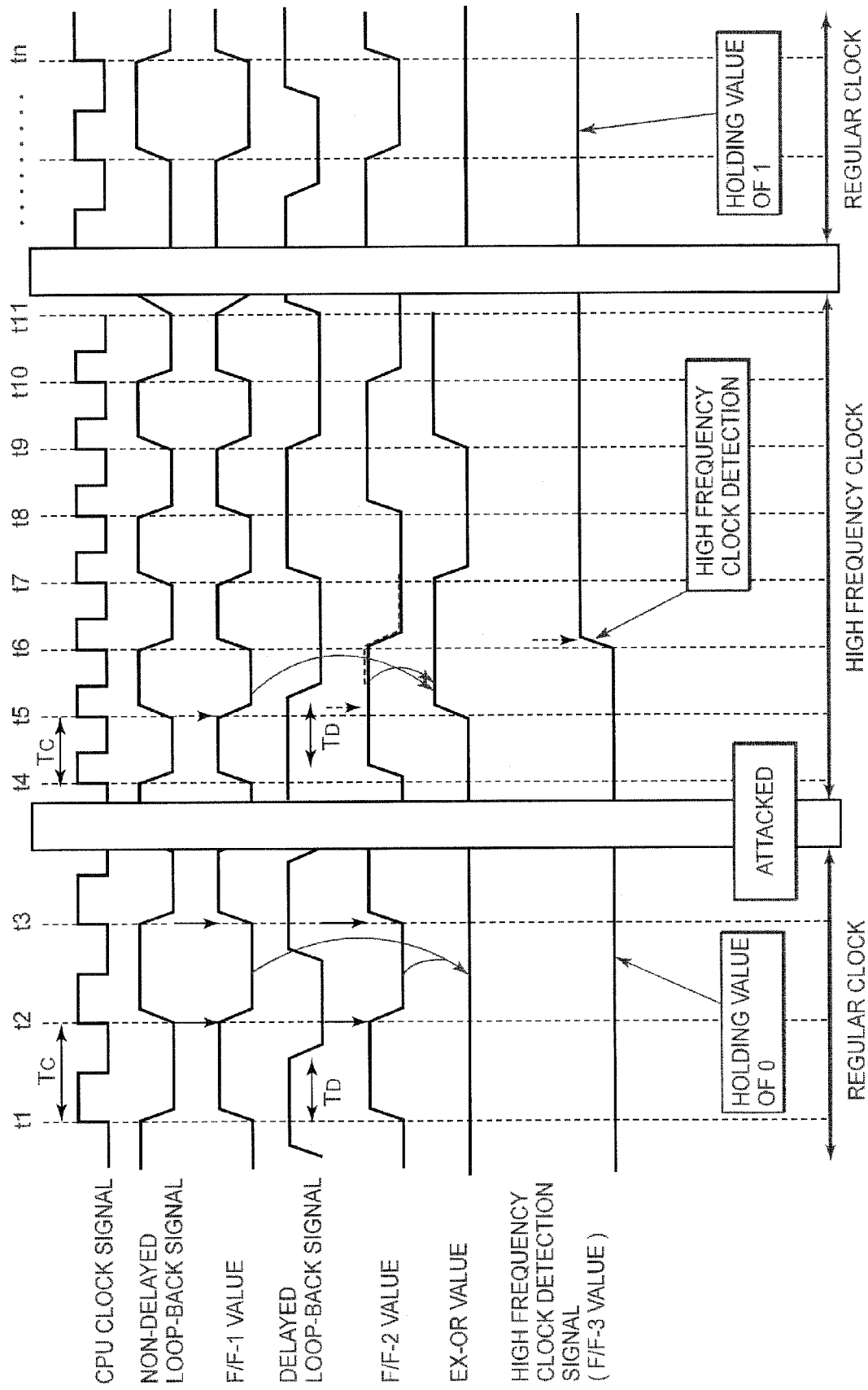
FIG. 4 is a time chart showing operation timings of the high frequency detection circuit according to the first embodiment.

FIG. 4 is a view of an operation timing of a high-frequency detection circuit according to the first embodiment of the invention. In FIG. 4, the CPU clock signal, the non-delayed loop-back signal, the F/F-1 value of the non-delay loop-back circuit, the delayed loop-back signal, the F/F-2 value of the delayed loop-back signal, the EX-OR value of the logic exclusive-OR circuit, and the high-frequency detection signal (F/F-3 value) are shown by using the horizontal axis as a time axis, respectively. In the horizontal axis, the period of the CPU clock signal is represented by TC, and the clock timings thereof are represented by from t1 to tn (n is integer).

During the timings t1 to t3, the non-delayed loop-back signal and the F/F-1 value shows complimentary pulse-waveforms corresponding to the CPU clock signal. For example, at the timing t2, the non-delayed loop-back signal changes the value of 0 to 1, and on the contrary, the F/F-1 value changes the value of 1 to 0.

Meanwhile, the delayed loop-back signal shows a waveform delayed by the delay time TD by the delay time circuit. However, as long as the delay time TD is shorter than the period TC of the CPU clock signal, the falling edge of the delayed loop-back signal occurs before the rising edge of the subsequent clock pulse of the CPU clock signal. For example, at the timing t2, the delayed loop-back signal has already the value of 0. Subsequently, the F/F-2 value, the output signal of the flip-flop circuit of the delayed loop-back circuit, changes the value of 1 to 0.

At the above time point, both of the F/F-1, F/F-2 values are 0 and both of the inverted signals of the above values are 1, and then there is no difference between thereof, respectively. Therefore, the output signal of the logic exclusive-OR circuit, the EX-OR value, becomes 0. At the timing t3, the EX-OR value of 0 is held by the flip-flop circuit of the detection-result output circuit unit corresponding to the clock pulse of the CPU clock signal, and the high frequency clock signal detection signal (F/F-3 value) of 0 is outputted. The above signal of 0 indicates that the CPU clock signal is regular.

Assuming that an external attack occurs at the beginning of the timing t4, and the period TC of the CPU clock signal becomes shorter than before and smaller than the delay time TD, the non-delayed loop-back signal and the F/F-1 value shows complimentary pulse waveforms corresponding to the CPU clock having a shortened period, as before. For example, at the timing t5, the F/F-1 value changes from 1 to 0.

However, since the delay time TD is longer than the period TC of the CPU clock signal, the falling edge of the delayed loop-back signal occurs after the rising edge of the subsequent pulse clock of the CPU clock signal. For example, at the timing t5, the delayed loop-back signal still has the value of 1, and then the F/F-2 value of the output signal from the flip-flop circuit of the delayed loop-back circuit holds the value of 1 correspondingly to the rising edge of the clock pulse at the timing t5.

At the above time point, since the F/F-1 value is 0 and meanwhile the F/F-2 value is 1, both of the inverted signals are different from each other and arises a differential. Therefore, the output signal of the logic exclusive result from the exclusive-OR circuit becomes 1. At the timing t6, the EX-OR value of 1 is held by the flip-flop circuit in the detection-result output circuit unit corresponding to the clock pulse of the CPU clock signal, and the high frequency detection signal (F/F-3 value) of 1 is outputted. The above detection signal indicates that the CPU clock signal is irregular.

After the timing t11, even when the external attack is halted and the period TC of the CPU clock signal is recovered, the high frequency clock detection signal (F/F-3) outputs thereafter value of 1. The control circuit can take measures such as halting the power supply, etc., corresponding to the high frequency clock detection signal indicating the irregularity.

According to the first embodiment of the invention explained before, in the case where the high frequency clock is provided to the high frequency clock detection circuit 100, the high frequency clock detection circuit 100 can detect quickly the inputted high frequency clock without counting the clocks. Therefore, attack even by small number of high frequency clocks can be detected. In addition, since the high frequency clock detection circuit 100 consists of only several logic gates, and three flip-flop circuits without a ring oscillator, or a counter circuit, the LSI-chip area enlargement is not necessary and also the LSI-chip cost reduction is possible.

The threshold to determine the high frequency clock can be set according to the delay time of the delay circuit. The delay time can be determined by a period corresponding to the high frequency clock, and there is no need to consider the pulse width of the high frequency clock. Furthermore, since whether it is regular or not can be determined by the delay time, there is no need to consider excessively the margin for error in the detection.

Second Embodiment

Figure 5:
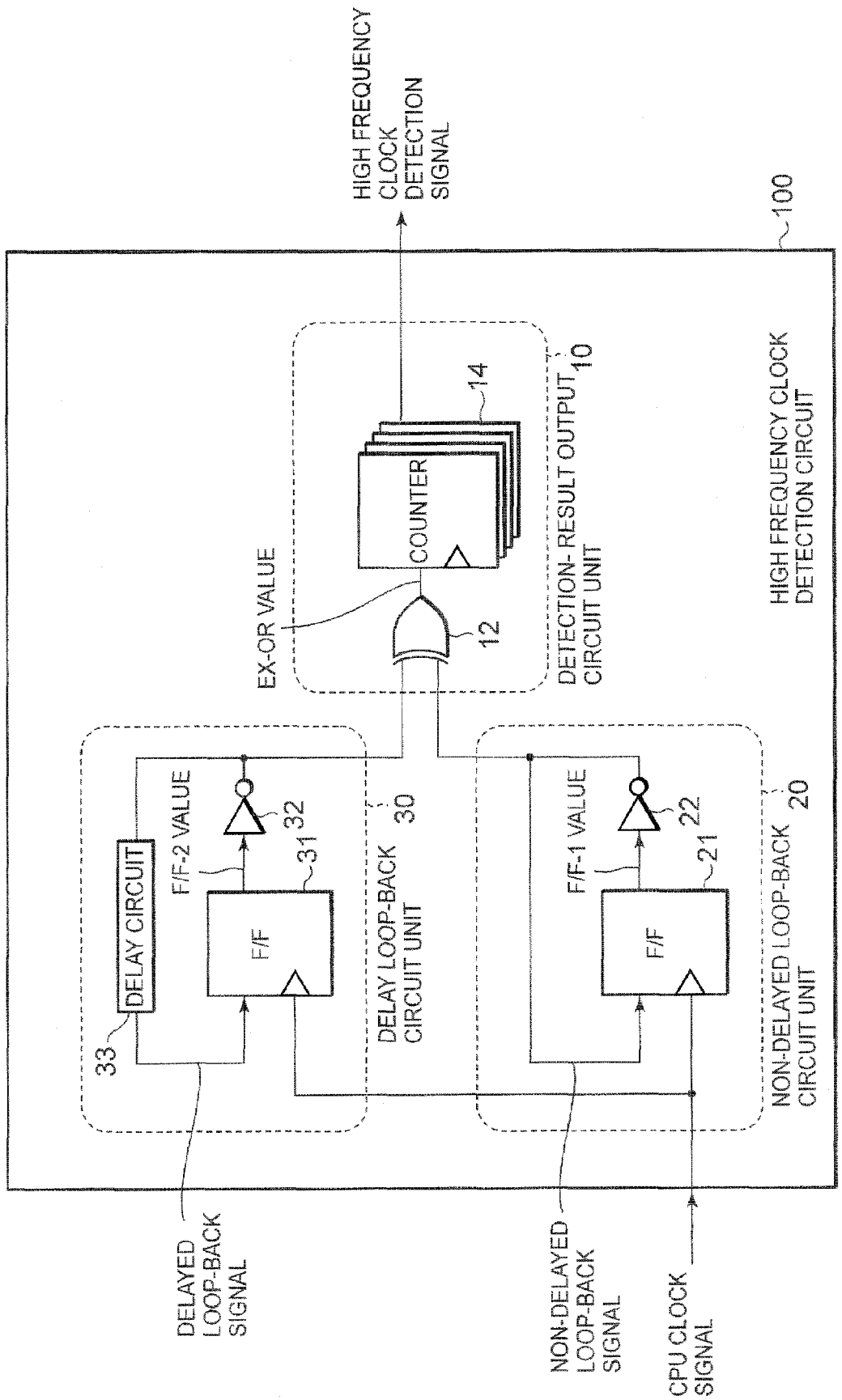
FIG. 5 is a block diagram of a high frequency detection circuit according to the second embodiment.

FIG. 5 is a block diagram of a high frequency detection circuit according to the second embodiment. The high frequency clock detection circuit 100 consists of the non-delay loop-back circuit 20, the delayed loop-back circuit 30, and the detection-result output circuit 10. The non-delay loop-back circuit 20, and the delayed loop-back circuit 30 have the same configuration as in the first embodiment.

According to the second embodiment, the configuration of the detection-result output circuit unit 10 is different from the one of the first embodiment. The detection-result output circuit unit 10 includes a logic exclusive-OR circuit 12 and a counter 14 realized by a plurality of flip-flop circuits. The logic exclusive-OR circuit 12 provides the counter 14 with the logic exclusive-OR value (EX-OR value) between the inverted signal from the non-delay loop-back circuit 20 and the inverted signal from the delay loop-back circuit 30. The counter 14 counts states where the logic exclusive-OR value (EX-OR value) has value of 1, in synchronization with the CPU clock signal, and the counter 14 starts to output the high frequency clock detection signal at a moment when the counter value exceeds to a counter value threshold. The counter value threshold is predetermined so as to have an appropriate value. Consequently, error detections of the high frequency clock caused by noise, etc. can be prevented.

Figure 6:
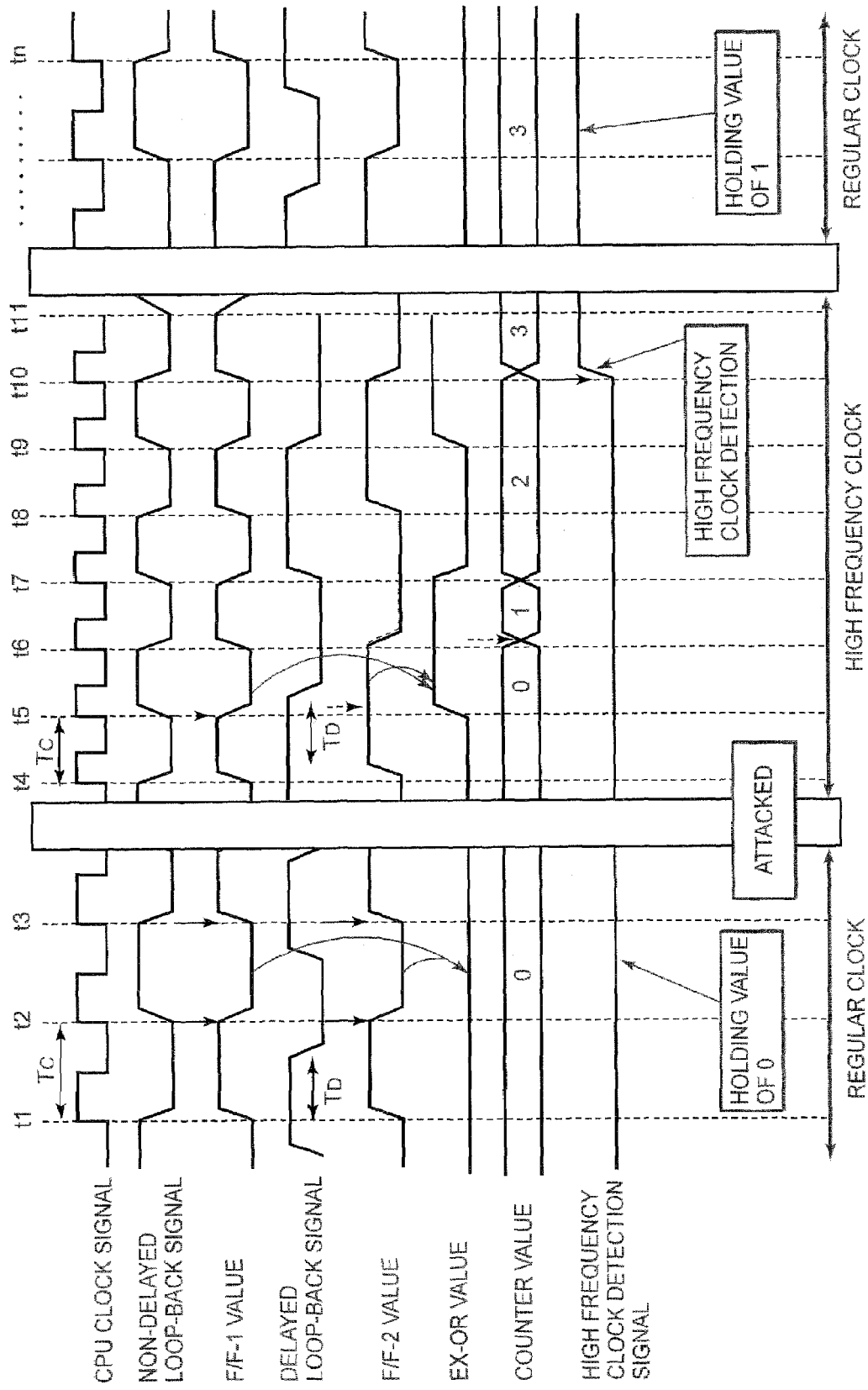
FIG. 6 is a time chart showing operation timings of the high frequency detection circuit according to the second embodiment.

FIG. 6 is a view of operation timings of the high frequency clock detection circuit of the second embodiment. The assumption is that the above-mentioned counter threshold value is 3. The operation at from the timing t1 to the timing t5 is the same as in the first embodiment. In other words, since the EX-OR value of the logic exclusive-OR circuit continues to be the value of 0 before the timing t5, the counter value is still the value of 0.

At the timing t5, high frequency clock is detected and then the output signal from the logic exclusive-OR circuit becomes 1. Subsequently, at the timing t6, the counter tales in the above EX-OR value of 1 corresponding to the clock pulse of the CPU clock signal, and sets the counter value to 1. Secondly, at the timing t7, the counter takes in the EX-OR value continuing to be the value of 1 and sets the counter value to 2.

At the timing t10, the count value reached to the count threshold of 3 sets the high frequency clock detection signal to the value of 1, and subsequently the value of 1 is being held by the counter.

According to the above-mentioned second embodiment, error detections of the high frequency clock can be prevented. According to the first embodiment, in the state where high frequency clock is instantaneously added to the external input clock by noise, etc., there is a possibility of error detection. However, according to the second embodiment, since the high frequency clock detection signal is outputted only in the case where the detection-result output circuit unit counts up to a predetermined number, the high frequency clock detection without errors can be completed even in the case where noises instantaneously are added to the external input clock.

Third Embodiment

Figure 7:
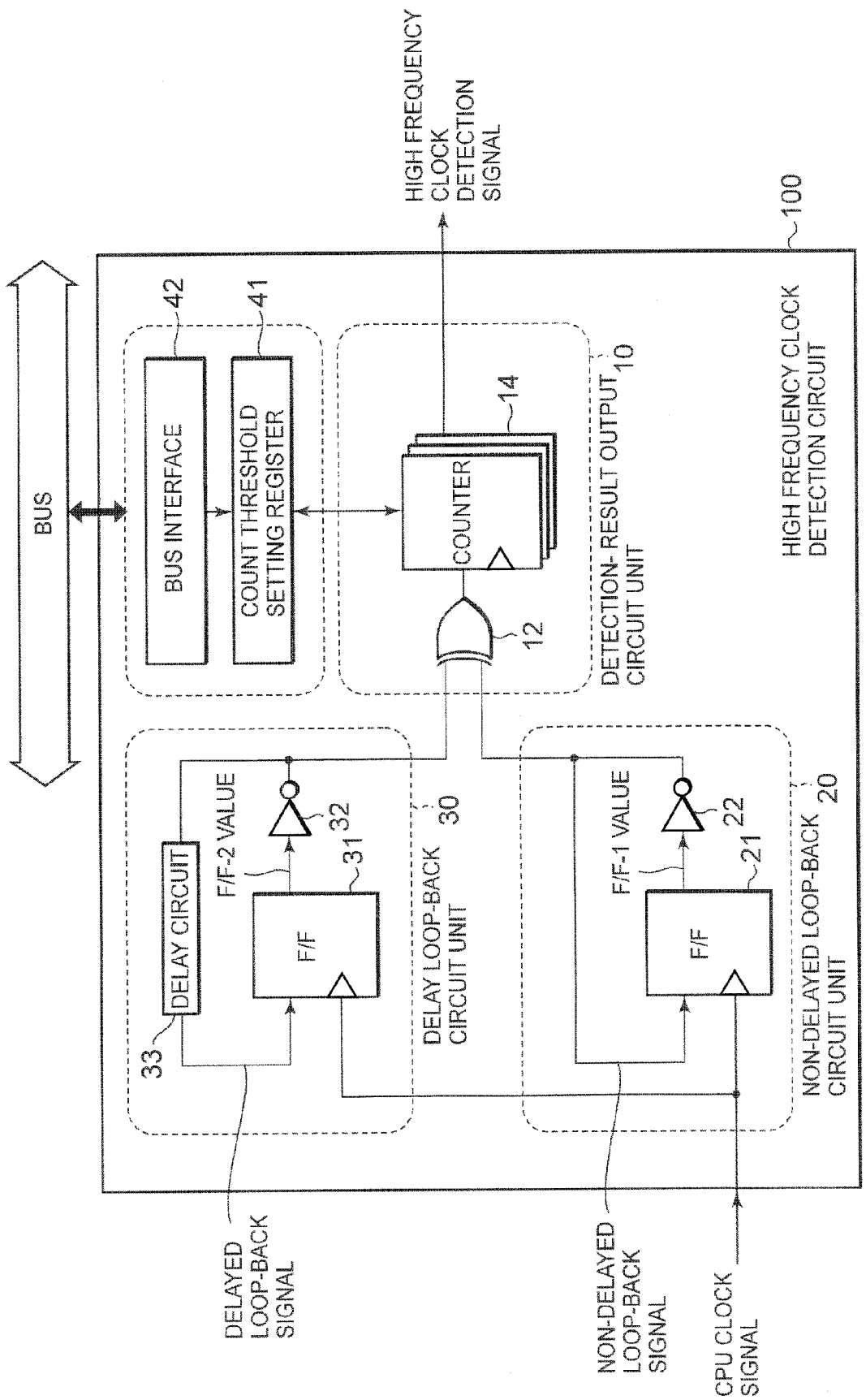
FIG. 7 is a block diagram of a high frequency detection circuit according to the third embodiment.

FIG. 7 is a block diagram of a high frequency detection circuit according to the third embodiment. The high frequency clock detection circuit 100 is composed by the non-delay loop-back circuit unit 20, the delayed loop-back circuit unit 30, and the detection-result output circuit 10, and further includes a count threshold setting register 41 and a bus interface 42. The non-delay loop-back circuit unit 20 and the delay loop-back circuit unit 30 have the same configurations as in the first and the second embodiments.

The detection-result output circuit unit 10 according to the third embodiment includes a function to change the count threshold referring to the content of the count threshold register 41, in addition to the configuration according to the second embodiment. The content of the count threshold register 41 is set by executing the software in the control circuit (cf. FIG. 2) through the bus interface. The counter 14 outputs the high frequency clock detection signal according to the count threshold set in the count threshold register 41 as in the second embodiment.

According to the above-mentioned third embodiment, the count threshold can be changed by the software. According to the second embodiment, the counter is included in order to prevent error detections cause by noise, etc., however, it is not easy to set the count threshold to be optimum for striking a balance between reduction of the influence caused by the noise and improvement of the security. Nevertheless, according to the third embodiment, the count threshold can be flexibly optimized because of the configuration that the count threshold becomes able to be changed by the software.

High frequency clock detection circuit of the present invention can be installed in not only LSIs used in high security equipments such as accounting terminals, but also various LSIs possibly attacked by external hackings.

What is claimed is:

1. A high frequency clock detection circuit for detecting a presence of an irregular high frequency state of a clock signal provided by a function circuit, the detection circuit comprising:

a delay circuit having a delay time set to be longer than a clock period corresponding to the irregular high frequency state;

a first flip-flop circuit to provide a delayed flip-flopped clock signal;

a first inverter to invert the delayed flip-flopped clock signal from the first flip-flop circuit and to provide a first inverted output signal, the first flip-flop circuit to receive the first inverted output signal as a loop-back signal;

a second flip-flop circuit to provide a delayed flip-flopped clock signal;

a second inverter to invert the delayed flip-flopped clock signal from the second flip-flop circuit and to provide a second inverted output signal;

the delay circuit to receive the second inverted output signal from the second flip-flop circuit and to provide a loop-back signal as an input to the second flip-flop circuit;

a detection-result output circuit to detect a difference between the first inverted output signal from the first flip-flop circuit and the second inverted output signal from the second flip-flop circuit and to provide the function circuit with the high frequency clock detection signal indicating a presence of an irregular high frequency state corresponding to an occurrence of the difference, wherein the detection-result output circuit includes a counter to count the occurrence of the detected difference and to output the high frequency clock detection signal when the counted occurrence of the difference exceeds to a predetermined threshold.

2. The high frequency clock detection circuit of claim 1, wherein the detection-result output circuit includes a count threshold setting register to set the predetermined count threshold, and the function circuit is adapted to flexibly change the content of the count threshold setting register to adjust the count threshold.

3. The high frequency clock detection circuit of claim 1, wherein the function circuit is connected to the count threshold register and is able to flexibly change the threshold setting via a bus interface and a bus.

4. The high frequency clock detection circuit of claim 1, wherein the clock signal provided by the function circuit is a central processing unit clock signal.

5. The high frequency clock detection circuit of claim 1, wherein the detection-result output circuit includes an exclusive OR (XOR) logic circuit receiving the first inverted output signal from the first flip-flop circuit and the second inverted output signal from the second flip-flop circuit as inputs, and the XOR logic circuit provides the detected difference as an input to the counter set with the predetermined threshold.

6. The high frequency clock detection circuit of claim 1, wherein each of the first and second delay flip-flop circuits is a D-type flip-flop.

7. The high frequency clock detection circuit of claim 1, wherein the delay circuit having a delay time set is adapted to provide an adjustable delay time.

* * * * *